US009146734B1

(12) United States Patent
Bryant et al.

(10) Patent No.: US 9,146,734 B1
(45) Date of Patent: Sep. 29, 2015

(54) HANDLING MANAGED OBJECT DATA

(75) Inventors: Lynn A. Bryant, Marlborough, MA (US); Jennifer LM Nicoletti, Southborough, MA (US); Kevin Labonte, North Grafton, MA (US); Sriram Krishnan, Shrewsbury, MA (US); Russell R. Laporte, Webster, MA (US)

(73) Assignee: EMC Corporation, Hopkinton, MA (US)

( * ) Notice: Subject to any disclaimer, the term of this patent is extended or adjusted under 35 U.S.C. 154(b) by 1796 days.

(21) Appl. No.: 12/144,711

(22) Filed: Jun. 24, 2008

(51) Int. Cl.
G06F 9/44 (2006.01)

(52) U.S. Cl.
CPC .................................. *G06F 8/71* (2013.01)

(58) Field of Classification Search
CPC ..................................... G06F 8/70; G06F 8/20
USPC .................................................. 717/114–135
See application file for complete search history.

(56) References Cited

U.S. PATENT DOCUMENTS

| 5,732,273 | A  | * | 3/1998  | Srivastava et al. ............ 717/128 |
| 5,946,694 | A  | * | 8/1999  | Copeland et al. ..................... 1/1 |
| 6,658,416 | B1 | * | 12/2003 | Hussain et al. ........................ 1/1 |
| 7,536,464 | B1 | * | 5/2009  | Dommety et al. ............. 709/228 |
| 2004/0098731 | A1 | * | 5/2004 | Demsey et al. ................ 719/328 |
| 2004/0103392 | A1 | * | 5/2004 | Zhang ............................ 717/122 |
| 2004/0167898 | A1 | * | 8/2004 | Margolus et al. ............... 707/10 |
| 2004/0220970 | A1 | * | 11/2004 | Wilson ........................ 707/104.1 |
| 2006/0020942 | A1 | * | 1/2006 | Ly et al. ......................... 718/100 |
| 2006/0212428 | A1 | * | 9/2006 | Nelson .............................. 707/3 |
| 2008/0127110 | A1 | * | 5/2008 | Ivanov et al. .................. 717/128 |
| 2009/0210885 | A1 | * | 8/2009 | Bantz et al. .................... 719/313 |

OTHER PUBLICATIONS

Williams et al., PASASM: A Method for the Performance Assessment of Software Architectures; WOSP '02, Jul. 24-26, 2002 Rome, Italy © 2002 ACM; pp. 179-189.*
Ryoo et al., Optimization Principles and Application Performance Evaluation of a Multithreaded GPU Using CUDA; Feb. 20-23, 2008, Salt Lake City, Utah, USA Copyright 2008 ACM; pp. 73-82.*
Iyengar et al., Design and Performance of a General-purpose Software Cache; 1999 IEEE; pp. 329-336.*

* cited by examiner

*Primary Examiner* — Satish Rampuria
(74) *Attorney, Agent, or Firm* — John T. Hurley; Jason A. Reyes; Krishnendu Gupta

(57) ABSTRACT

A method is used in handling managed object data. A software object is created which represents a managed object in a data storage system. The software object holds performance data for the managed object. The software object is created in response to a request for the performance data. Based on a determination that the performance data held by the software object is out of date, the software object is destroyed.

18 Claims, 3 Drawing Sheets

HANDLING MANAGED OBJECT DATA

BACKGROUND

1. Technical Field

This application relates to handling managed object data.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems, also referred to as server systems, may store and retrieve data using a storage device containing a plurality of host interface units, disk drives, and disk interface units. The host systems access the storage device through a plurality of channels provided therewith. Host systems provide data and access control information through the channels to the storage device, and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

Configuration and performance information may be associated with a data storage system. The configuration information may include information describing the physical and/or logical configuration in the data storage system. The logical configuration information may include, for example, information regarding logical objects such as RAID groupings, logically defined devices, and the like. The performance information may include, for example, data pertaining to how physical and logical objects of the data storage system are performing.

SUMMARY OF THE INVENTION

A method is used in handling managed object data. A software object is created which represents a managed object in a data storage system. The software object holds performance data for the managed object. The software object is created in response to a request for the performance data. Based on a determination that the performance data held by the software object is out of date, the software object is destroyed.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use handling managed object data. As described below, the technique allows a performance object (a type of software object) to be built on demand while a relationship to a parent object (another type of software object) is maintained.

Managed objects can have properties that reflect both relatively static content as well as dynamic content. Performance data is a class of data that is inherently dynamic in a manner that is expected, since it is meant to reflect usage and not state or personality. The technique allows creation and maintenance of performance data on demand in a backward compatible manner that allows existing clients to continue to access the data while freeing up system resources when such data is not being consumed.

Conventionally, performance data has been processed and stored just like any other object property, as part of the general object instance. This occurred even though only certain clients wished to consume the performance data in an active manner. This led to a number of issues with the conventional approach:

Objects were artificially bloated by properties that were not considered crucial to all but performance-centric clients.

Performance-centric clients were forced to consume and process full managed objects in order to get just the performance data that they wanted.

Performance objects, once built, were cached for the lifetime of the management session and never released, even if statistics were no longer being tracked.

By contrast, the technique allows separating the processing of the performance objects away from the parent managed objects, so that the performance objects can be updated more frequently as well as accessed independently by clients that only want performance data. By making the creation of performance objects on-demand, corresponding system resources are consumed only when necessary, and these resources can be freed up when the performance data is no longer needed.

Figure 1:
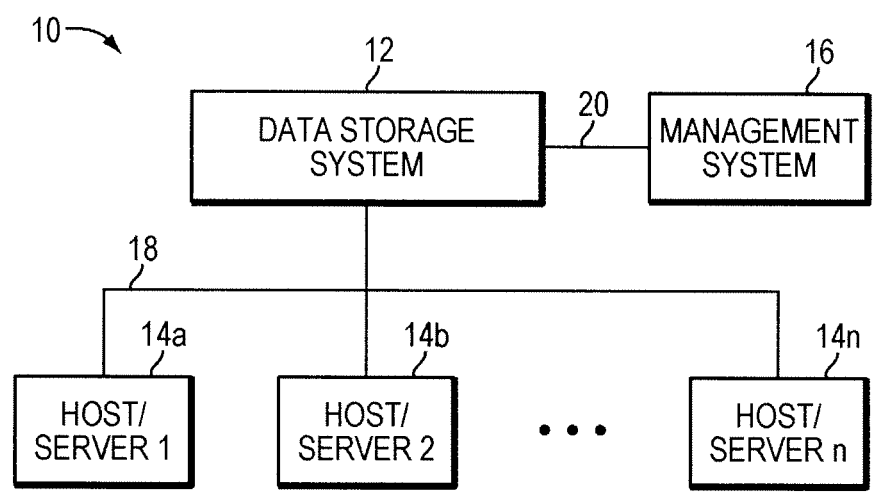
FIG. 1 is an example of an embodiment of a computer system that may utilize the techniques described herein.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
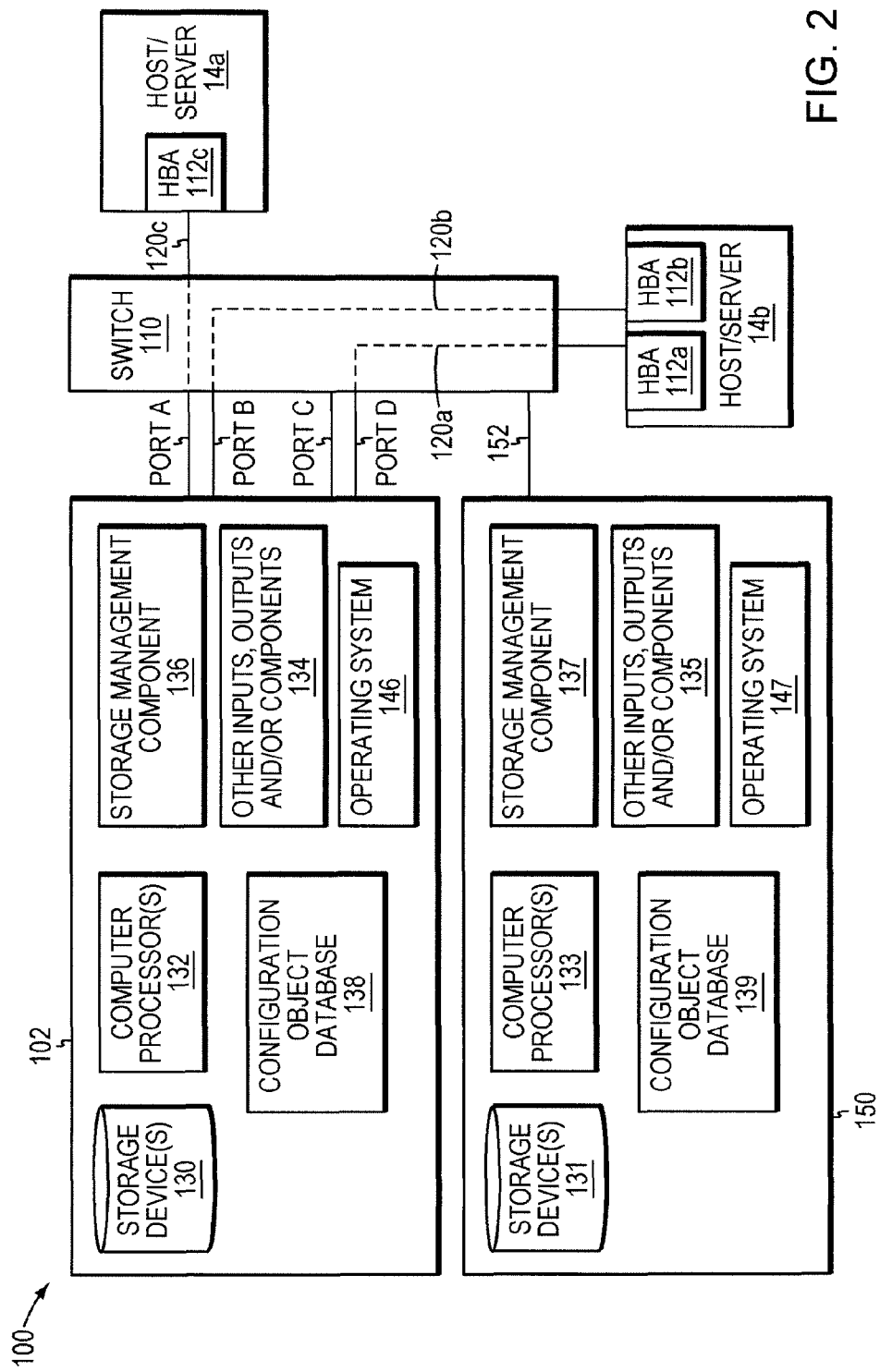
FIGS. 2-3 illustrate in more detail components that may be included in an embodiment of the system of FIG. 1.

Referring now to FIG. 2, shown is an example 100 of components that may be used in connection with techniques described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs. In connection with the techniques described herein, other embodiments may use other ways in defining a path that may vary with the connectivity in each embodiment.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage system 102 is illustrated as including one or more storage devices 130, one or more computer processors 132, an operating system 146, a configuration object database 138, a storage management component 136, and other inputs, outputs and/or components 134.

An example of an embodiment of the data storage system 102 is the CLARiiON™ data storage system by EMC Corporation which includes two computer processors as represented by the element 132 although an embodiment may include a different number of processors for use in connection with the techniques described herein.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102. In one embodiment, the operating system 146 may be or include the Windows XP™ operating system by Microsoft Corporation.

The storage management component 136 may be a component included as part of management software for management of the data storage system. The component 136 may manage the configuration object database 138 which includes data structures of configuration information for the data storage system 102. The configuration information may include data describing a defined configuration such as the different components as well as data regarding the performance and other aspects of these components. As described elsewhere herein in more detail, the configuration information may include information regarding physical components, logical components, and other general configuration information. The physical component information may include information about physical components in the data storage system, for example, the physical disks, fans, and the like. The logical component information may include information about the logically defined components such as, for example, the LUNs, defined RAID groupings (RGs), storage groups of LUNs (SGs), and the like. Such logical component information may include what storage groups are defined and what LUNs are included in each of the SGs. Additionally, performance data regarding, for example, logical and/or physical device usage may be included in the configuration information with the appropriate physical and/or logical devices. Other general configuration information may include, for example, the WWN of the data storage system, the serial number of the data storage system, and the like.

Configuration information, such as the logical device definitions and SGs, may be defined by a data storage system manager using the management system 16. The foregoing configuration information may be received by component 136 and may be used in connection with populating the configuration object database 138. It should be noted that although a database is used in connection with storing the configuration information, it will be appreciated by those skilled in the art that other data stores or data containers may be used.

The other inputs, outputs, and/or components 134 may represent other hardware and/or software components that may be included in the data storage system 102. The element 134 may include software components such as, for example, other management software for management of the data storage system, and the like. The element 134 may also include hardware components such as, for example, memory, other storage areas, and the like. The element 134 may also include other inputs and/or outputs such as command line inputs, configuration options, and the like, as described herein.

Figure 3:
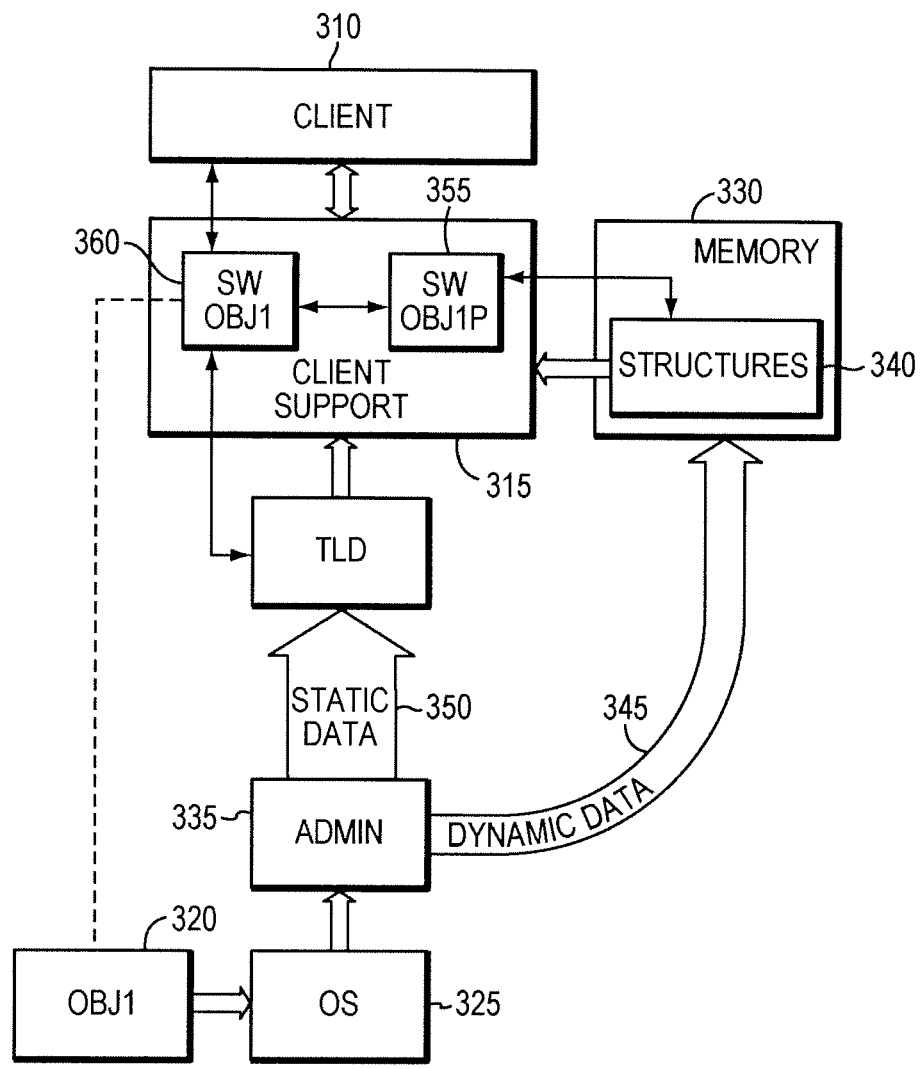

FIG. 3 illustrates additional aspects of data storage system 102 supporting an example implementation of the technique referenced above. All or a portion of operating system 325 may be, include, or be included in operating system 146. Managed object OBJ1 320 may be or include any managed object (physical or logical object) in the system (e.g., disk, LUN). The remaining aspects of FIG. 3 are included in storage management component 136 and/or other inputs, outputs and/or components 134.

As shown in FIG. 3, through operating system 325, admin software 335 receives property data pertaining to object 320. As described in more detail below, admin software 335 makes information derived from such property data available to client software 310 (e.g., user interface software) through client support software 315.

When client software 310 needs property data pertaining to object OBJ1 320, client software 310 makes a request to software object SW OBJ1 360 which represents object 320. The request is handled differently depending on whether the request is for static property data 350 or dynamic property data 345.

If the request is for static property data, object 360 responds to the request by returning the static property data pertaining to object 320 to client software 310. (Object 360 is preloaded with static property data from admin software 335 for object 320. In at least one implementation, the static property data is presented by admin software 335 in tag length data (TLD) format to object 360.)

If the request is for dynamic data, object 360 acts differently. If a performance data software object SW OBJ1P 355 does not already exist, it is created in response to the request, to represent object 320 for dynamic data, and upon creation object 355 is loaded with dynamic data for object 320 from structures 340 of memory 330. Object 355 responds to the request by returning the dynamic property data pertaining to object 320. In at least one implementation, the dynamic property information is returned to object 360 which returns it to client software 310. In another implementation, the dynamic property information is returned to client software 310 directly by object 355.

In at least one implementation, once per polling cycle (1) admin software 335 updates structures 340 with dynamic property data for one or more (e.g., all) managed objects and (2) one or more (e.g., all) performance data objects (e.g., object 355) are destroyed, to avoid making available potentially stale information. For example, the polling cycle may have a period in the range of 10 seconds to one hour inclusive, and operating system 325 may collect property data for one or more (e.g., all) managed objects such as object 320 once per second.

The technique is particularly useful in an environment in which much or all information that is to be conveyed to the user is objectized by use of objects such as objects 360, 355, for example. Data related to performance of manage objects may be collected by operating system 325 for one or more purposes, include for use in making determinations, e.g., with the aid of client software 310, as to whether the data storage system is meeting its service level goals. Client software 310 may be, include, or be included in data storage analyzer software, for example. The technique allows this performance data to be tracked and made available to client software 310 in a scalable way, especially where the data storage system may include thousands of logical managed objects such as LUNs, RAID groups, storage groups, and ports. Other types of managed objects include physical objects such as disks, storage processors, fans, and power supplies. A managed object may be anything that exists in the system that needs to be managed. Performance data may include data relating to, for example, the number of reads and/or writes the managed object has experienced.

In at least one implementation, client software 310 may expect to receive all managed object property data, including both static data and performance data, for a managed object from one software object, i.e., object 360 representing object 320. To maintain backward compatibility with such client software 310 (e.g., without requiring changes in API calls) in such implementation, object 355 does not return performance data directly to client software 310 and instead returns performance data to object 360 which returns it to client software 310.

In accordance with the technique, since building and storing objects consumes resources, a performance object is not built until client software 310 requests performance data for the corresponding managed object, and performance objects that contain data that is out of date compared to the contents of structures 340 (i.e., "stale" performance objects) are destroyed, to avoid bloating up memory. This does not result in performance data becoming lost or unavailable, because operating system 325 has all of the property data including the performance data originally; the function of client support software 315 is to facilitate the availability of the property data to client software 310 (e.g., if client software 310 is or includes user interface software, client support software 315 makes the property data more user interface usable).

Static data may include configuration data that does not change much, such as data indicating the owner of a LUN; by contrast, performance data is constantly changing (e.g., every second at operating system 325).

Typical example uses of a performance object are to allow client software 310 to request performance data indicating the number of reads experienced by a LUN since the last time the system was booted, and to allow client software 310 to request performance data indicating the number of idle ticks and busy ticks for a storage processor. In at least one implementation, only client software 310 performs analysis (e.g., historical or accumulation analysis) on the performance data; operating system 325, admin software 335, and client support software 315 including performance objects merely pass along accurate and meaningful performance data to client software 310 which can make an analysis-based report to the user.

Memory 330 may be or include shared memory that can be accessed by both admin software 335 and client support software 315. Admin software 335 and client support software 315 may run in the same process space. In at least one implementation, admin software 335 may put performance data into memory 330 by performing a memory dump of data from operating system 325. Thus, for example, a specific byte in structures 340 may represent a specific piece of performance data for a specific LUN.

In at least one implementation, the storage system includes local and peer storage processors for redundancy and high availability, and the local storage processor can access memory on the peer storage processor through a special purpose communications link ("CMI link"). In such an implementation, after admin software 335 for the local storage processor puts performance data in memory 330, client support software 315 uses the CMI link to copy performance data from memory on the peer storage processor to memory 330, and creates structures 340 (e.g., sorted lists such as hash tables) based on performance data from both local and peer storage processors. Thus in the implementation performance object 355 is built from such structures 340 derived from both local and peer storage processors.

Admin software 335 may load data into memory 330 when prompted by client support software 315, in which case client support software 315 controls the polling cycle which governs when performance objects become stale. In at least one implementation, with respect to static data, admin software 335 and client support software 315 have facilities that allow client support software 315 to request only the data that has changed.

Since a performance object, when first built, is loaded with all performance data for the corresponding managed object, if performance data for the same managed object is requested again within the same polling cycle, such request may be serviced directly out of the performance object without the need to read from structures 340. The performance object is built on first request per polling cycle, and is destroyed once structures 340 is updated (e.g., completely updated) with new performance data.

In at least one implementation, the polling cycle for performance may be shorter than the polling cycle for static data.

In at least some implementations, dynamic data may be or include any data that is not designated as static data, such as data that is expected to change over time, and/or any data that is not set at create time or relates to the health or current state of the managed object. In at least some implementations, dynamic data may be or include any data becomes available and valid once a statistics logging function is activated.

The environment as described herein may be characterized as an area which may be loaded with objects used in subsequent processing. As described herein, objects may be cached in an environment associated with a script so that the same cached object(s) are defined or loaded with subsequent executions of the same script. In other words, the cached object is loaded into the environment associated with the next execution instance of the same script.

It should be noted that the various components used in connection with the techniques described herein may be implemented using hardware and/or software. For example, the components of the client support software may be written in any one or more programming and/or scripting languages such as, for example, C++, Java, and XML.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in handling managed object data, the method comprising:
    creating a software object representing a managed object in a data storage system, the managed object including static content and dynamic content, the software object holding performance data for the managed object, wherein the performance data is associated with the dynamic content, the software object being dynamically created in response to a request for the performance data, wherein the managed object includes physical and logical objects;
    accessing and processing performance data associated with the software object separately from the managed object represented by the software object; and
    based on a determination that the performance data held by the software object is out of date, destroying the software object.

2. The method of claim 1, further comprising:
    receiving performance data from an operating system of the data storage system;
    storing the performance data in a memory of the data storage system; and
    based on the performance data in the memory of the data storage system, causing the software object to hold performance data for the managed object.

3. The method of claim 1, further comprising:
    if the software object has not yet been created, avoiding creating the software object until performance data for the managed object is requested.

4. The method of claim 1, further comprising:
    periodically polling for performance data; and
    destroying the software object as a result of the polling.

5. The method of claim 1, wherein client software makes the request to another software object which represents the managed object.

6. The method of claim 1, wherein the request is handled differently from a second request, the second request being for static data for the managed object.

7. The method of claim 1, further comprising:
    loading the software object with dynamic data for the managed object; and
    responding to the request for performance data via another software object.

8. The method of claim 1, further comprising:
    once per polling cycle, updating memory structures with dynamic property data the managed object and another managed object.

9. The method of claim 1, further comprising:
    providing the performance data to data storage analyzer software.

10. The method of claim 1, wherein the performance data includes data relating to the number of reads the managed object has experienced.

11. The method of claim 1, wherein client software receives all managed object property data, including the performance data, for the managed object from another software object.

12. The method of claim 1, wherein an operating system of the data storage system has the performance data originally and client support software facilitates the availability of the performance data to client software.

13. The method of claim 1, wherein the software object passes along the performance data to client software which makes an analysis-based report to a user.

14. The method of claim 1, wherein the data storage system includes local and peer storage processors, the local storage processor including memory on the peer storage processor accessible through a special purpose communications link, and the method further comprises copying performance data from memory on the peer storage processor to memory on the local storage processor.

15. The method of claim 1, wherein client support software controls a polling cycle which governs when the software object becomes stale.

16. The method of claim 1, further comprising:
    receiving property data for the managed object, the property data comprising static data and the performance data; and
    basing a response to the request on distinguishing, within the property data, between the performance data and the static data.

17. A system for use in handling managed object data, the system comprising:
    a software object representing a managed object in a data storage system, the managed object including static content and dynamic content, the software object holding performance data for the managed object, wherein the performance data is associated with the dynamic content, the software object being dynamically created in response to a request for the performance data, wherein the managed object includes physical and logical objects;
    accessing and processing performance data associated with the software object separately from the managed object represented by the software object; and
    memory structures configured to convey the performance data to the software object, wherein the software object is destroyed based on a determination that the performance data held by the software object is out of date relative to the contents of the memory structures.

18. The system of claim 17, wherein once per polling cycle the memory structures are updated with new performance data from an operating system of the data storage system.

* * * * *